United States Patent
Benvegnu'

(10) Patent No.: US 9,632,329 B2
(45) Date of Patent: Apr. 25, 2017

(54) METHOD OF MANUFACTURING A METAL FRAME FOR SPECTACLES AND FRAME MANUFACTURED BY THAT METHOD

(71) Applicant: SAFILO SOCIETÀ AZIONARIA FABBRICA ITALIANA LAVORAZIONE OCCHIALI S.P.A., Pieve di Cadore (BL) (IT)

(72) Inventor: Ivo Benvegnu', Padua (IT)

(73) Assignee: SAFILO SOCIETA' AZIONARIA FABBRICA ITALIANA LAVORAZIONE OCCHIALI S.P.A., Pieve di Cadore (IT)

( * ) Notice: Subject to any disclaimer, the term of this patent is extended or adjusted under 35 U.S.C. 154(b) by 0 days.

(21) Appl. No.: 14/902,886

(22) PCT Filed: Jun. 27, 2014

(86) PCT No.: PCT/IB2014/062659
§ 371 (c)(1),
(2) Date: Jan. 5, 2016

(87) PCT Pub. No.: WO2015/004560
PCT Pub. Date: Jan. 15, 2015

(65) Prior Publication Data
US 2016/0154253 A1    Jun. 2, 2016

(30) Foreign Application Priority Data
Jul. 8, 2013   (IT) .............................. PD2013A0191

(51) Int. Cl.
*G02C 5/02*     (2006.01)
*B23K 33/00*    (2006.01)
(Continued)

(52) U.S. Cl.
CPC ................ *G02C 5/02* (2013.01); *B23K 33/00* (2013.01); *G02C 5/12* (2013.01); *G02C 5/22* (2013.01); *G02C 2200/10* (2013.01)

(58) Field of Classification Search
CPC ... G02C 1/06; G02C 5/02; G02C 5/04; G02C 13/00; G02C 13/001; G02C 2200/10
(Continued)

(56) References Cited

U.S. PATENT DOCUMENTS 1,265,546 A  *  5/1918  Styli ....................... G02C 5/02
                                                        351/124
1,713,546 A  *  5/1929  Nelson ..................... G02C 5/02
                                                        351/124

FOREIGN PATENT DOCUMENTS

EP       1 063 046 A2    12/2000
GB          381069        9/1932

OTHER PUBLICATIONS

International Search Report and Written Opinion issued in PCT Application No. PCT/IB2014/062659 mailed Nov. 26, 2014.

* cited by examiner

*Primary Examiner* — Huy K Mai
(74) *Attorney, Agent, or Firm* — RatnerPrestia

(57) ABSTRACT

A method of manufacturing a metal frame for spectacles with a front frame, a pair of lens-carrying eyepieces of metal wire and a central bridge for support on the nose, is described, the bridge being obtained in a single piece, by bending a wire of metal material, and having a pair of corresponding lengths of wire which are capable of being attached to corresponding lens-carrying eyepieces, a recess being provided by milling on each of the lengths, each recess having at least a partial interference fit with a respective surface portion of the metal wire of the corresponding lens-carrying eyepieces, each of the lengths being welded to
(Continued)

the corresponding portion of lens-carrying eyepieces at the location of the respective recess to attach each lens-carrying eyepiece to the central bridge.

9 Claims, 3 Drawing Sheets

(51) Int. Cl.
*G02C 5/12* (2006.01)
*G02C 5/22* (2006.01)

(58) Field of Classification Search
USPC .............................................. 351/41, 124–135
See application file for complete search history.

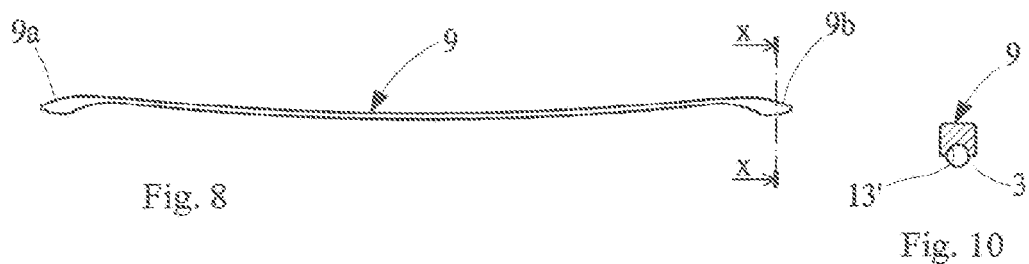
Fig. 8
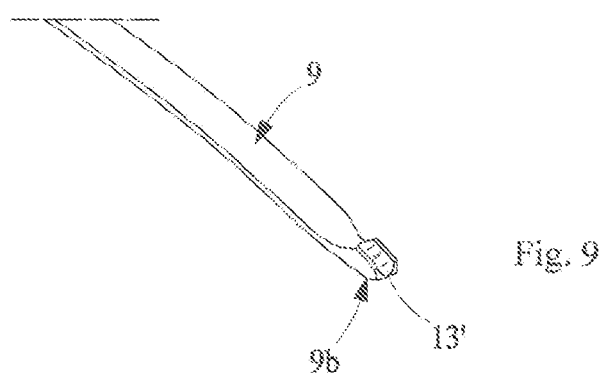
Fig. 10
Fig. 9
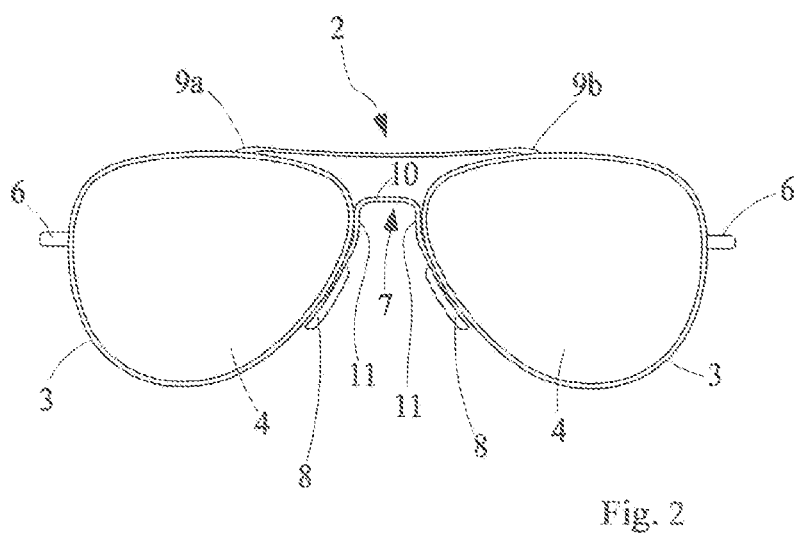
Fig. 2

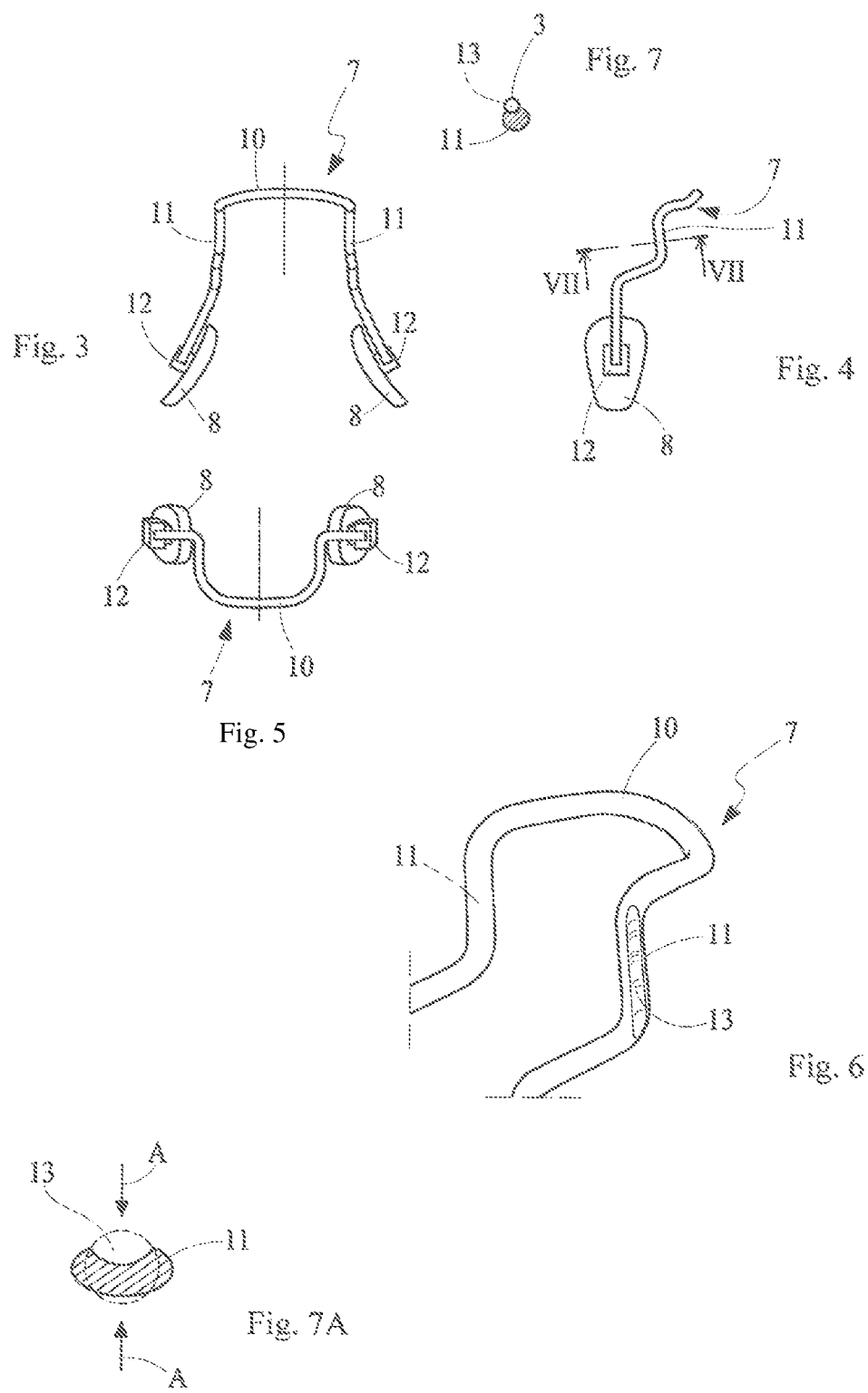

METHOD OF MANUFACTURING A METAL FRAME FOR SPECTACLES AND FRAME MANUFACTURED BY THAT METHOD

CROSS REFERENCE TO RELATED APPLICATIONS

This application is the U.S. National Phase Application of PCT/IB2014/062659, filed Jun. 27, 2014 which claims priority to Italian Patent Application No. PD2013A000191, filed Jul. 8, 2013, the contents of such applications being incorporated by reference herein.

TECHNICAL SCOPE

This invention relates to a method of manufacturing a metal frame for spectacles.

The invention also relates to a frame manufactured in accordance with the abovementioned method of manufacture.

TECHNICAL BACKGROUND

The invention relates to the specific scope of frames for spectacles made of metal materials, and in particular made of metal wire. Frames of this type provide that both the lens-carrying eyepieces and the central bridge supported on the nose are manufactured from metal wire and are connected together by welding. Conventional technologies provide that the welded connection is located in the limited zone of contact between the eyepieces and the central bridge, a zone in which the corresponding wire-shaped structures of substantially cylindrical surface area touch tangentially. Because the contact surface area is small, conventional technology does not succeed in imparting sufficient relative stability of attachment unless an extensive welded zone is provided, but this has the limitation that it gives rise to major deformations in the frame, as well as being not particularly desirable from the aesthetic point of view. On the other hand, although an improvement from the aesthetic point of view and with regard to tension states, reducing the welded zone may bring about the disadvantage of compromising the integrity of the joined parts of the frame in the welded zone. These frames in fact have the advantage of being light and highly flexible, thanks to their metal wire structure, which is often thin, and the stresses induced by deformations generated on the frame during use, stresses which might prejudice stability in the welded zone, with possible easy and unforeseen breakage of the frame, are transferred to the welded zones between the eyepieces and the supporting bridge on the nose.

SUMMARY OF THE INVENTION

The problem underlying this invention is that of providing a method for the manufacture of a frame for spectacles and a frame obtained by such method designed in order to overcome the abovementioned limitations with respect to the known art.

This problem is resolved by aspects of the invention through a method of manufacturing a frame for spectacles and a frame obtained by that method obtained in accordance with the appended claims

BRIEF DESCRIPTION OF THE DRAWINGS

The characteristics and advantages of the invention will be more apparent from the following detailed description of a preferred embodiment illustrated indicatively and without limitation with reference to the appended drawings in which:

FIG. 2 is a front elevation view of the front frame of the frame in FIG. 1, FIGS. 3, 4 and 5 are respectively front elevation, side elevation and plan views from above of a detail of the frame in the preceding figures, FIG. 6 is a partial perspective view of the detail in FIG. 3, FIG. 7 is a view in cross-section along the line VII-VII in FIG. 4, FIG. 7A is a view in cross-section on a magnified scale corresponding to that in FIG. 7 during an operational stage in the method of manufacture of the frame, FIG. 8 is a view in side elevation of a further detail of the frame in FIG. 1, FIG. 9 is a partial perspective view of the detail in FIG. 8, FIG. 10 is a view in cross-section along the line X-X in FIG. 8.

DETAILED DESCRIPTION OF THE INVENTION

Figure 1:
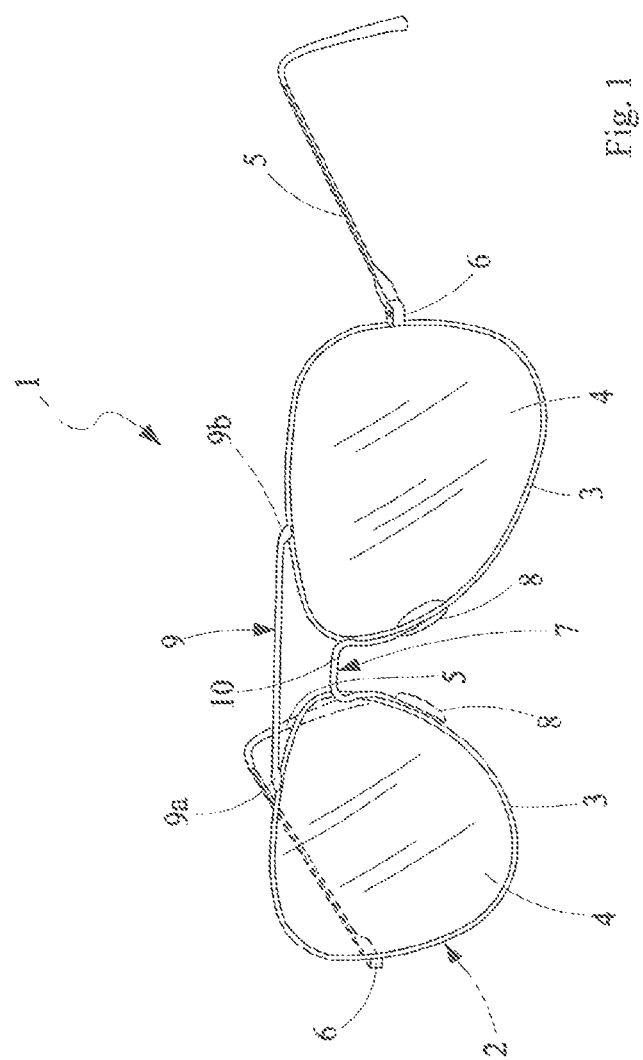
FIG. 1 is a perspective view of a frame for spectacles manufactured using the method according to the invention.

With reference to the figures mentioned, 1 indicates a frame for spectacles manufactured using the method of manufacture according to an aspect of the invention. This frame comprises a front frame 2, with lens-carrying eyepieces 3, framing corresponding lenses 4. Arms 5 attached by means of lateral hinges 6, attached to eyepieces 3, are hinged to front frame 2.

The frame also comprises a central bridge 7 for support on the nose, which can be attached to eyepieces 3, and has a pair of nose pads 8.

9 indicates a frontal connecting cross-piece between eyepieces 3, in the region of the brow arches, positioned on frame 2 above the central point 7 of support on the nose.

According to a principal advantage of frame 1, both lens-holding eyepieces 3 and bridge 7 for support on the nose are made of metal material and in particular using a metal wire structure.

The method according to an aspect of the invention provides that central bridge 7 for support on the nose is made in one piece by bending a metal wire. In this bending operation, a central cross-piece 10, which is extended on opposite sides by a pair of corresponding lengths 11 of wire that can be attached to corresponding lens-holding eyepieces 3, is defined on bridge 7. Each of these lengths 11, which is straight, are extended in a terminal portion of bridge 7, bearing a corresponding block 12 for attachment of corresponding nose pad 8 at their free ends.

In a subsequent stage of the method provision is made for the construction of a corresponding recess or groove 13 on each length 11 of bridge 7, made by milling with the removal of material. This recess 13 also extends in a straight line longitudinally along corresponding length 11, and forms a seat for at least a partial interference fit with the respective portion of corresponding eyepiece 3 opposite it within the zone of mutual attachment. In other words recess 13 is of such a shape as to receive part of the external surface of the cylindrical profile of the metal wire defining the portion of the eyepiece which is intended to be attached together with bridge 7.

For the corresponding attachment the method provides that a weld should be made between each of lengths 11 of bridge 7 and the corresponding portion of eyepiece 3 housed in corresponding recess 13 of the abovementioned length in order that each eyepiece 3 can be rigidly attached to central bridge 7 for support on the nose.

With regard to the welding operation it is provided that a process using filler material (welding/brazing or brazing) should be used, with heating by electromagnetic induction, of the type which is frequently used for the attachment of metal spectacle components, or a process of welding with the help of a laser, in which the laser source may be used to perform either welding/brazing or alternatively welding without filler material.

With reference to the cross-sectional view in FIG. 7, the portion of eyepiece 3 which is intended to be attached to the bridge has a transverse cross-section with a circular profile and recess 13 is constructed with a concavity having a corresponding transverse cross-section with a radius of curvature substantially equal to the radius of the circular cross-section of the metal bar of the lens-holding eyepiece. This ensures a substantial interference fit between recess 13 and corresponding eyepiece portion 3 housed therein. As a result of recess 13 a greater contact surface area is guaranteed between the parts which are intended to be welded together, with an obvious advantage in greater stability of the mutual attachment between the coupled parts. In addition to this, the interference fit which is brought about through the recess ensures better and more stable relative positioning between the parts which are to be welded, with an obvious advantage also due to better accuracy in the relative configurable positioning prior to the welding stage.

The method also provides that, before the stage of milling, in order to obtain recess 13, each length 11 of central bridge 7 is subject to deformation in the plastic field, with squashing in each transverse cross-section along a diametral direction identified by arrows A in FIG. 7A. Through this deformation surface portions of the said length of lesser and greater radius of curvature with respect to the nominal radius of the circular cross-section of the undeformed wire (circular cross-section in dashed lines in FIG. 7A) are defined along length 11 corresponding to each transverse cross-section. It will be noted that the milling is performed in the region of length 11 whose part of the profile of the transverse cross-section has a greater radius of curvature than the nominal radius (FIG. 7A), so that recess 13 is made in a portion of length 11 of wire having a greater surface area (due to the squashing in the direction of arrows A in FIG. 7A).

The method also provides that a stage of adjusting the relative positions between recess 13 and corresponding attachment zone of respective lens-carrying eyepiece 3 may be provided between the milling stage and the welding stage. This adjustment is made by adjusting the bending of the wire forming bridge 7 for support on the nose with respect to the position of corresponding eyepieces 3 in such a way that each recess 13 engages corresponding portions of eyepieces 3 with a substantial interference fit, so that they can be subsequently attached together by welding. This adjustment stage therefore makes it possible to position the parts being joined precisely, before the stage of welding the parts together.

In accordance with the method according to an aspect of the invention provision may also be made for a stage of adjusting the height imparted to assembly of the front part of the frame with the arms with the central bridge supported on the nose and the upper front cross-piece. Such an adjustment stage, also known in the appropriate technical sector by the term "calibration", may also be provided before the stages of manufacturing an entire lot or production volume, and does not need to be carried out for each individual piece in the lot which has to be produced.

A sequence of milling and welding stages wholly similar to those described above are providing for attaching front cross-piece 9 to lens-carrying eyepieces 3.

With reference to FIG. 9, the frontal cross-piece is conveniently shaped as a body having a bar structure extending predominantly longitudinally and having thickenings at the opposite longitudinally extremities 9a, 9b, in which recesses or grooves 13' of structure substantially similar to grooves 13 are made such as to form corresponding seats for at least a partial interference fit with a respective external surface portion of the metal bar forming corresponding lens-carrying eyepiece 3 opposite them within the zone of mutual attachment (upper portion of the eyepiece corresponding to each brow arch zone).

As an alternative to the abovementioned example cross-piece 9 may also be constructed using a metal wire structure, in particular using wire of circular cross-section with opposing extremities 9a, 9b intended to be subjected to deformation by squashing in a similar way to that specified for the abovementioned squashing in respect of lengths 11 of central bridge 7 supported on the nose.

After the milling stage provision is made for a stage of welding between the mutually attached surface portions, in which each free extremity 9a, 9b of frontal cross-piece 9 is attached to corresponding eyepiece 3 in the position of relative recess 13'.

With particular reference to FIG. 10, in the zone in which it is attached to cross-piece 9 eyepiece 3 has a transverse cross-section with a circular profile and recess 13' is made with the concavity of the transverse cross-section having a radius of curvature substantially equal to the radius of the circular cross-section of the metal wire of the lens-carrying eyepiece. This structure allows for a substantial interference fit between the parts attached together. Also, thanks to recess 13', a greater contact surface between the parts which are to be welded together is guaranteed, with an obvious advantage in the greater stability of the mutual attachment between the coupled parts.

The invention thus overcomes the problem stated, providing the abovementioned advantages in comparison with known solutions.

In addition to the advantages claimed in relation to provision of the recesses obtained by milling in the metal wire to improve the quality of the attachment between the coupled parts it should be pointed out that the use of a central bridge for support on the nose in one piece advantageously makes it possible to reduce the overall number of welds on the front of the frame. In conventional methods for the manufacture of similar metal frames welding is in fact performed between the central bridge and the lens-carrying eyepieces, and then the so-called "hooks", that is to say those portions of metal wire which carry the nose pads at the extremities of the bridge are welded on.

In accordance with the method according to the invention the second welds are not necessary.

It is felt that each individual weld, in particular in the case of less recent welding techniques (induction welding), involves heating the material of the components which are to be welded, and also the material of the components immediately adjacent to them (lens-carrying eyepieces), to a high temperature. This heating can easily change the microstructure of the material itself, and as a consequence may weaken its mechanical properties (ease of breakage at the eyepieces). Thus in reducing the number of welds which have to be made in the front portion the risk of deterioration of the mechanical properties of the materials making it up in the vicinity of the central bridge is diminished.

Secondly the so-called "cycle time" for the model of spectacles which has to be manufactured, that is the time required to produce the piece, is reduced, with a consequent reduction in production cost.

The invention claimed is:

1. A method of manufacturing a metal frame for spectacles comprising a front frame with a pair of lens-carrying eyepieces of metal wire on each of which there is attached on the outermost part a hinge projection for a corresponding temple arm, and a central bridge for support on the nose connected to the lens-carrying eyepieces and incorporating a pair of nose pads, the method comprising:

providing the bridge as a single part obtained by bending a wire of metal material, forming a central cross-piece (10) extended on opposing sides into a pair of corresponding lengths of wire capable of being attached to the corresponding lens-holding eyepieces, the bridge (7) having corresponding means of attachment for corresponding nose pads at its respective free ends, producing a recess, through milling with the removal of material, on each of the said lengths of the central bridge, each recess forming a respective seat which is at least partly interference fitted to a corresponding external surface portion of the metal wire of the corresponding lens-holding eyepiece opposite to it in the zone in which they are attached, making a weld between each of the lengths of the central bridge and the corresponding portion of the lens-holding eyepiece, corresponding to the respective recess, to secure each lens-holding eyepiece to the central bridge for support on the nose.

2. The method according to claim 1, in which at least the portion of the eyepiece of metal wire has a transverse cross-section of circular profile and the recess is provided with a concavity in its transverse cross-section having a radius of curvature substantially identical to the radius of the circular cross-section of the metal wire of the lens-holding eyepiece.

3. A The method according to claim 2, in which the lengths of the central bridge extend in a straight line and the recess in each length extends longitudinally along the corresponding length.

4. A method according to claim 1, comprising before the milling:

making a deformation is made within the plastic range of each of the lengths of the central bridge, with squeezing of the transverse cross-section along a diametral direction, with the definition of surface portions of these lengths having a smaller and greater radius of curvature than the circular profile of the cross-section of the wire, the milling being performed in a portion of the length of greater radius of curvature such that the corresponding recess can be obtained in a portion of the length of wire having a more extensive surface.

5. The method according to claim 1, in which a further comprising adjusting of the relative positioning between each recess and the corresponding zone for attachment of the respective lens-holding eyepiece is provided between the milling and welding, this adjustment being made through adjustment of the fold of the wire forming the bridge for support on the nose such that each recess is engaged by and interference fitted to the corresponding portions of the lens-holding eyepiece so that they can be secured together by welding.

6. The method according to claim 1, further comprising attaching a front cross-piece to the lens-holding eyepieces corresponding to a brow zone of the frame, provision being made for:

forming a recess in each of the opposing longitudinal extremities of the brow piece through milling with the removal of material, each recess forming a respective seat for at least a partial interference fit with a corresponding external surface portion of the metal wire of the corresponding lens-holding eyepiece opposite it in the zone in which they are attached, making a weld between each extremity of the cross-piece and the corresponding portion of the lens-carrying eyepiece at the respective recess to secure the cross-piece to the lens-holding eyepieces.

7. The method according to claim 6, in which at least the portion of the eyepiece of metal wire has a transverse cross-section of circular profile and the recess is provided with a concavity in the transverse cross-section having a radius of curvature which is substantially identical to the radius of the circular cross-section of the metal wire of the lens-holding eyepiece.

8. A spectacle frame comprising a front frame with a pair of lens-holding eyepieces of metal wire, to the outermost portion of each of which is secured a hinge projection for a temple arm, with a central bridge for support on the nose, providing connection between the lens-holding eyepieces and bearing a pair of nose pads, the central bridge supported on the nose being attached to the lens-holding eyepieces using the method according to claim 1.

9. The spectacle frame according to claim 8, comprising a central cross-piece for attachment to the lens-holding eyepieces, extending frontally in a brow zone of the frame, this cross-piece being attached to the lens-holding eyepieces forming recess in each of the opposing longitudinal extremities of the brow piece through milling with the removal of material, each recess forming a respective seat for at least a partial interference fit with a corresponding external surface portion of the metal wire of the corresponding lens-holding eyepiece opposite it in the zone in which they are attached, making a weld between each extremity of the cross-piece and the corresponding portion of the lens-carrying eyepiece at the respective recess to secure the cross-piece to the lens-holding eyepieces.

* * * * *